United States Patent
Lee et al.

(10) Patent No.: US 7,844,169 B2
(45) Date of Patent: Nov. 30, 2010

(54) METHOD FOR CONVERTING DATA FORMAT

(75) Inventors: Scot Lee, Taipei Hsien (TW); Daniel Kao, Taipei Hsien (TW)

(73) Assignee: Via Technologies, Inc., Hsin Tien, Taipei Hsien (TW)

( * ) Notice: Subject to any disclaimer, the term of this patent is extended or adjusted under 35 U.S.C. 154(b) by 1091 days.

(21) Appl. No.: 11/543,159

(22) Filed: Oct. 5, 2006

(65) Prior Publication Data

US 2007/0081790 A1    Apr. 12, 2007

(30) Foreign Application Priority Data

Oct. 7, 2005  (TW) .............................. 94135223 A

(51) Int. Cl.
*H04N 5/91* (2006.01)
*H04N 7/00* (2006.01)
*H04N 5/00* (2006.01)
*H04N 7/01* (2006.01)

(52) U.S. Cl. .......................... 386/95; 386/126; 386/131

(58) Field of Classification Search .................. 386/95, 386/125, 126, 131
See application file for complete search history.

(56) References Cited

U.S. PATENT DOCUMENTS

| | | | | |
|---|---|---|---|---|
| 7,346,267 | B2 * | 3/2008 | Suzuki | 386/95 |
| 7,474,837 | B2 * | 1/2009 | Nomura | 386/104 |
| 7,526,182 | B2 * | 4/2009 | Shibutani | 386/52 |
| 7,577,341 | B1 * | 8/2009 | De Haan | 386/125 |
| 2001/0046373 | A1 * | 11/2001 | Ando et al. | 386/95 |

* cited by examiner

*Primary Examiner*—Thai Tran
*Assistant Examiner*—Hung Q Dang
(74) *Attorney, Agent, or Firm*—Thomas, Kayden, Horstemeyer & Risley, LLP

(57) ABSTRACT

A method for converting the MPEG 1 data format to the MPEG 2 data format is provided. The method includes reading and mapping the MPEG 1 data format to the MPEG 2 data format to generate a first title file and a second title file. Sequential playback functions defined in the Video 1.1 specification is supported when the first title file is selected for playback. Otherwise, playback controls functions defined in the Video 2.0 specification is supported when the second title file is selected for playback.

13 Claims, 7 Drawing Sheets

| Detailed structure of play list of VCD |
|---|
| Play List Header |
| Number of Items (NOI) |
| List ID |
| Previous List Offset |
| Next List Offset |
| Return List Offset |
| Playing Time |
| Play Item Wait Time |
| Auto Pause Wait Time |
| Play Item#1 Number |
| ... |
| Play Item#(NOI) Number |

Fig.4A

| Detailed structure of selection list of VCD |
|---|
| Selection List Header |
| Number of Selections(NOS) |
| Base of Selection Number |
| List ID |
| Previous List Offset |
| Next List Offset |
| Return List Offset |
| Default List Offset |
| Time-out List Offset |
| Wait Time for Time-out |
| Loop Count |
| Jump Timing |
| Play Item Number |
| Selection #BSN Offset |
| ... |
| Selection #(BSN+NOS-1) Offset |

Fig.4B

| Detailed structure of play list of VCD | Structure of DVD |
|---|---|
| Play List Header | Note1 |
| Number of Items (NOI) | Total PG Numbers |
| List ID | PGC Number |
| Previous List Offset | Previous PGC Number |
| Next List Offset | Next PGC Number |
| Return List Offset | Go Up PGC Number |
| Playing Time | PGC Playback Time |
| Play Item Wait Time | Cell Still Time |
| Auto Pause Wait Time | Note2 |
| Play Item#1 Number | Cell #1 Cell Start/End Address |
| ... | ... |
| Play Item#(NOI) Number | Cell #(NOI) Cell Start/End Address |

Note1 : Can be disregarded

Note2 : Cannot correspond to the structure of DVD, and must be further researched and developed

Fig.5A

| Structure of play list of VCD | Structure of DVD |
|---|---|
| Selection List Header | Note1 |
| Number of Selections(NOS) | Button Numbers |
| Base of Selection Number | Note1 |
| List ID | PGC Number |
| Previous List Offset | Previous PGC Number |
| Next List Offset | Next PGC Number |
| Return List Offset | Go Up PGC Number |
| Default List Offset | Note2 |
| Time-out List Offset | Force Selection Button with button Command (Jump to PGC Number) |
| Wait Time for Time-out | Button Force Selection End Time |
| Loop Count | PG repeat Count |
| Jump Timing | Note2 |
| Play Item Number | Cell Start/End Address |
| Selection #BSN Offset | Button 1 Command: Jump PGC Number |
| ... | ... |
| Selection #(BSN+NOS-1) Offset | Button NOS Command: Jump PGC Number |

Note1 : Can be disregarded

Note2 : Cannot correspond to the structure of DVD, and must be further researched and developed

Fig.5B

METHOD FOR CONVERTING DATA FORMAT

BACKGROUND OF THE INVENTION (1) Field of the Invention

The invention relates to a method for converting data having different formats into single data format, and more particularly, to a method for converting MPEG 1 (Motion Picture Experts Group) format and MPEG 2 format into the single data format.

(2) Description of the Prior Art

In the past, when a disc player plays data having different formats, the disc player has a plurality of play navigations that respectively play these data, wherein the play navigations will occupy system resources, for example, the system memory of the disc player. As shown in FIG. 1, which illustrates that the disc player in the prior art has two different play navigations for playing different formats that are MPEG 1 play navigation 103 and MPEG 2 play navigation 105, wherein the MPEG 1 play navigation 103 is used for playing the MPEG 1 data format, for example, VCD (Video Compact Disk), and the MPEG 2 play navigation 105 is used for playing the MPEG 2 data format, for example, DVD (Digital Video Disk). In other words, the disc player in the prior art is equipped with the MPEG 1 and MPEG 2 play navigations, and the MPEG 1 data format and MPEG 2 data format are played through different play navigations. That is, at the same time, the other play navigation that is not in use occupies the system memory of the disc player 101, which causes the system memory to be wasted and used.

SUMMARY OF THE INVENTION

In consideration of system resources that are limited, if data having different formats can be converted by a data converting method into a single data format, and simultaneously different play navigations for playing different formats can be integrated as a single navigation, then the single navigation can play according to the single data format, so that the data having different formats can be played by the single navigation, and the use and waste of the system resources can be reduced.

In view of aforesaid, the present invention provides a method for converting data having different formats into a single data format. The method includes the steps of: reading a table of content (TOC) of a MPEG 1 data format, wherein the table includes a plurality of tracks; making each track correspond to a program of a MPEG 2 data format, wherein the plurality of programs are included in a program chain of the MPEG 2 data format; and producing a first title file that corresponds to the MPEG 2 data format, wherein the program chain includes a plurality of part of titles, each part of title at least includes a program, each program at least includes a cell, and the program chain consists of the first title file.

In the preferred embodiment of the present invention, when selecting the first title file to play, then sequence play function of Video 1.1 specification is supported.

In another preferred embodiment of the present invention, the method for converting data format includes the steps of: reading a play sequence descriptor file of the MPEG 1 data format, wherein the play sequence descriptor file includes a plurality of lists, and each list includes a plurality of items; making each list correspond to a program chain of the MPEG 2 data format; making each item of each list correspond to a program of each program chain of the MPEG 2 data format; and producing a second title file that corresponds to the MPEG 2 data format, wherein each program chain includes a plurality of part of titles, each part of title at least includes a program, each program at least includes a cell, and the plurality of program chains consist of the second title file.

In another preferred embodiment of the present invention, when selecting the second title file to play, then play control function of the Video 2.0 specification is supported.

BRIEF DESCRIPTION OF THE DRAWINGS

The present invention will now be specified with reference to its preferred embodiment illustrated in the drawings, in which:

FIG. 4A is a detailed structure of play list of VCD;

FIG. 4B is a detailed structure of selection list of VCD;

FIG. 5A is drawing which shows that a play list structure of VCD corresponding to a structure of DVD; and FIG. 5B is a drawing which shows that a selection list structure of VCD corresponding to a structure of DVD.

DESCRIPTION OF THE PREFERRED EMBODIMENTS

Figure 1:
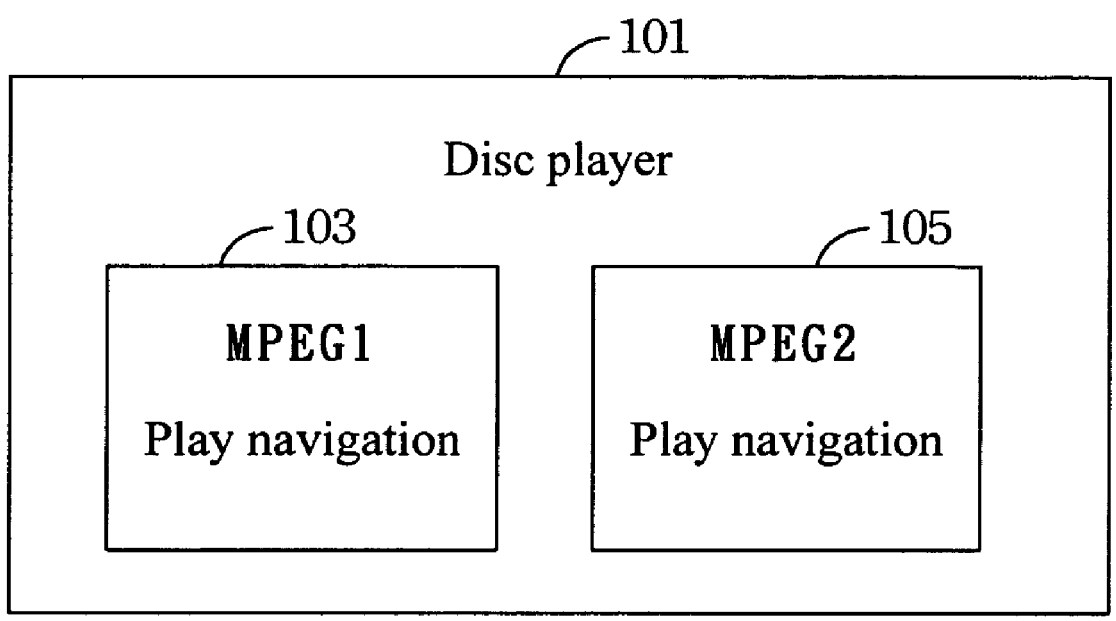
FIG. 1 is a drawing which shows play navigations in the prior disc player.

The present invention provides a method for converting MPEG 1 (Motion Picture Experts Group) data format into MPEG 2 data format. The following example will explain how to convert VCD data format into DVD data format.

Firstly, play mode and data format of the VCD disc specification are analyzed. The VCD disc has Video 2.0 specification and Video 1.1 specification, wherein the biggest difference between them is that the Video 2.0 has various interaction operations that allow to add a selection list on a high-resolution still frame, and users can select the desired contents to be played. Moreover, the Video 2.0 has a playback control function (PBC). On the contrary, the Video 1.1 only supports the sequence play function. The following will explain the Video 2.0 specification, because the Video 2.0 specification can be compatible with the Video 1.1 specification.

VCD disc players that comply with the Video 2.0 specification include a play sequence descriptor file and a table of content, wherein the play sequence descriptor file includes a plurality of lists, each list includes a plurality of items, and the table of content includes a plurality of tracks. The play sequence descriptor file defines three play mode lists, i.e., a play list, a selection list and an end list, wherein the detailed structures of the play list and the selection list are shown in the FIG. 3A and FIG. 3B. Moreover, the end list represents stop playing, the detailed descriptions of which are omitted here. The above-mentioned table of content will record data that are relative to disc and to each track.

The Video 2.0 specification includes four basic items, i.e., play item, play list, selection list and selection item. The play item is a main content of the disc, for example, one or many still frame(s), MPEG 1 video track, MPEG 1 video file and Compact Disc Digital Audio (CDDA) sound track. The play item can be a video track or sound track format, and can be saved in a data file manner. The play list can have one or many play item(s), and the play list defines play sequence of the play item, and automatically plays in a sequence order without selection from users. The selection list can use a play items as a background. In general, a still frame plus background music is used, and some selection buttons are put on the still frame, i.e., selection items for users to select through a mouse or remote control. The selection item indicates a link that can link to the play list, or to another selection list. When user turns on the PBC (playback control) function, then the disc player will play according to the play list defined by the play sequence descriptor file of the VCD disc. In other words, each list of the play sequence descriptor file will play in a pre-determined sequence, in order to support the playback control function. On the other hand, when user turns off the PBC function, then the disc player will play, i.e., sequence play, according to tracks recorded by the table of content of VCD disk.

The following will analyze data format of DVD disc. The DVD disc includes a plurality of title files, wherein each title file at least includes a program chain, each program chain includes a plurality of part of titles, each part of title at least includes a program, and each program at least includes a cell that is the basic unit of the DVD. In other words, each program is composed of at least one cell. These program chains and programs are defined as sections and chapters of play. Because the VCD uses the lists as unit to play, while the DVD uses the program chains as unit to play, if the lists of the VCD correspond to the program chains of the DVD, which means that other data formats of the VCD also correspond to the data formats of the DVD, then the data format of the VCD can whole correspond to the data format of the DVD, wherein the correspondence can be achieved in a look-up table manner. Furthermore, in order to support the play control function of the Video 2.0 specification and the sequence play function of the Video 1.1 specification, at the time when the data format of the VCD is converted into the data format of the DVD, two title files are produced. The inner structures of these two title files can support these two different functions respectively.

Figure 2A:
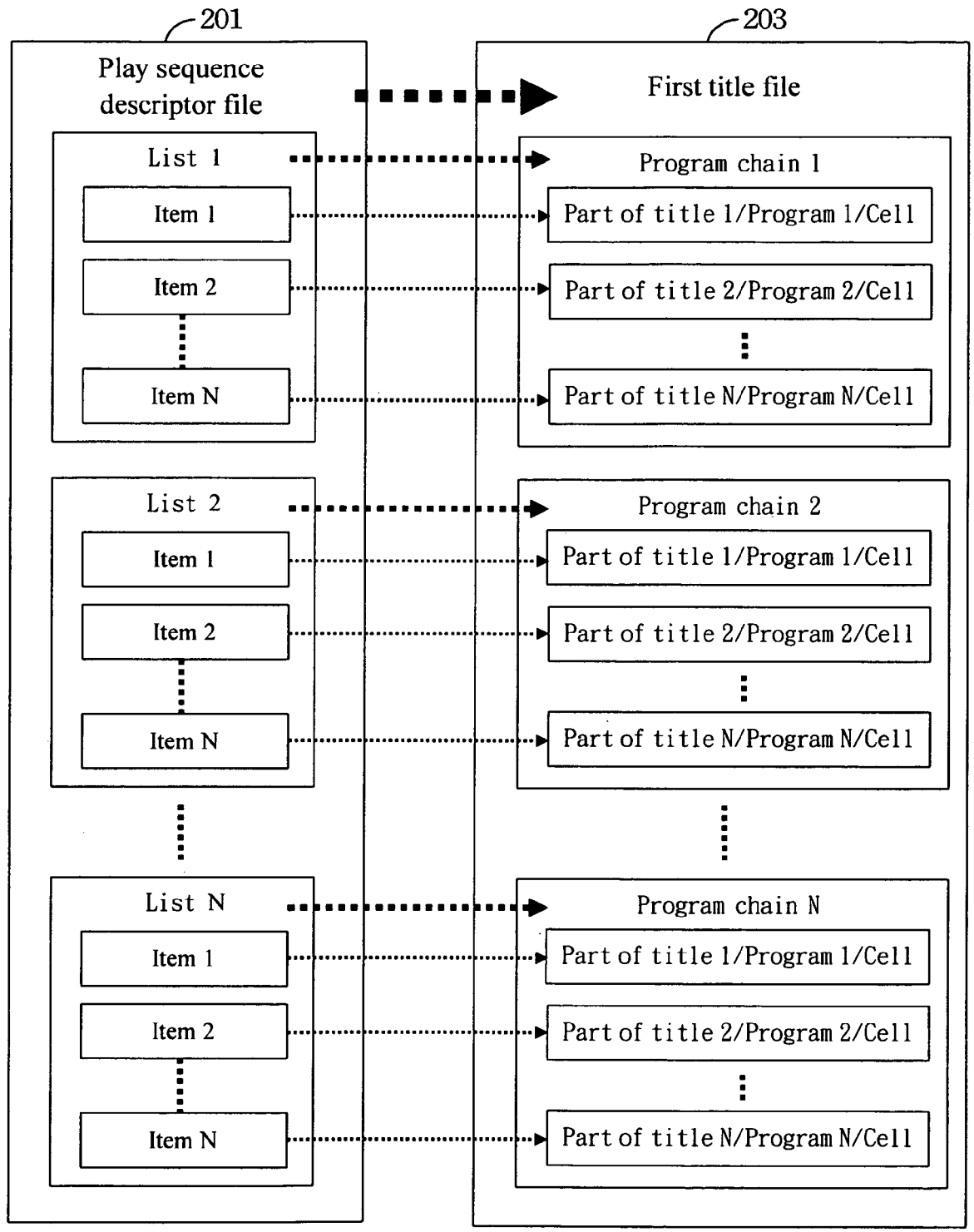
FIG. 2A is a drawing which shows the method for converting data format of the present invention.

The present invention provides the method for converting data format. Please refer to FIG. 2A that shows the method for converting data format of the present invention, which method includes the steps of: reading a play sequence descriptor file 201, wherein the play sequence descriptor file 201 includes a plurality of lists, and each list includes a plurality of items; making each list correspond to a program chain of the MPEG 2 data format; and making each item of each list correspond to a program of each program chain of the MPEG 2 data format, wherein each program chain includes a plurality of part of titles, each part of title at least includes a program, each program at least includes a cell, and the plurality of the programs chains constitute a first title file 203. Because each list of the play sequence descriptor file 201 has defined play sequence thereof, the plurality of the program chains of the first title file 203 will correspond to the play sequence defined by each lists to play. Therefore, when the first title file 203 is selected to play, then the playback control function of the Video 2.0 specification is supported, wherein the corresponding manner can be achieved by building a table, and also can be achieved in a look-up table manner. There are two methods that make each list correspond to a program chain of the MPEG 2 data format. The first method is to only make a list of the play sequence descriptor file 201 correspond to a program chain of the MPEG 2 data format at one time, and then to play by the play navigation. The advantage of such a method is that converting interface is simpler, and the disadvantage is that size of the program codes cannot be reduced. The second method is to make all lists of the play sequence descriptor file 201 correspond to all program chains of the MPEG 2 data format at one time, and then to play by the play navigation. The advantage of such a method is that the size of the program code can be greatly reduced, and it is easy to debug. The disadvantage is that the capacity of memory that is needed will increase for storing all corresponding data. These two methods have their advantages and disadvantages, and thus, which method should be used depends on condition of system resource.

Figure 3A:
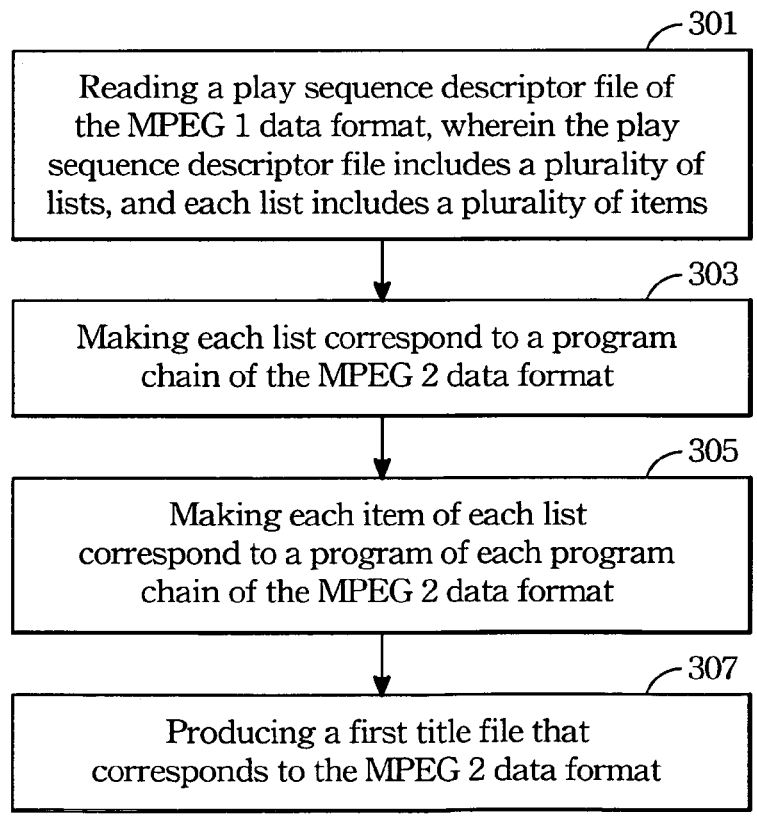
FIG. 3A is a flowchart of the method for converting data format of the present invention.
Figure 3B:
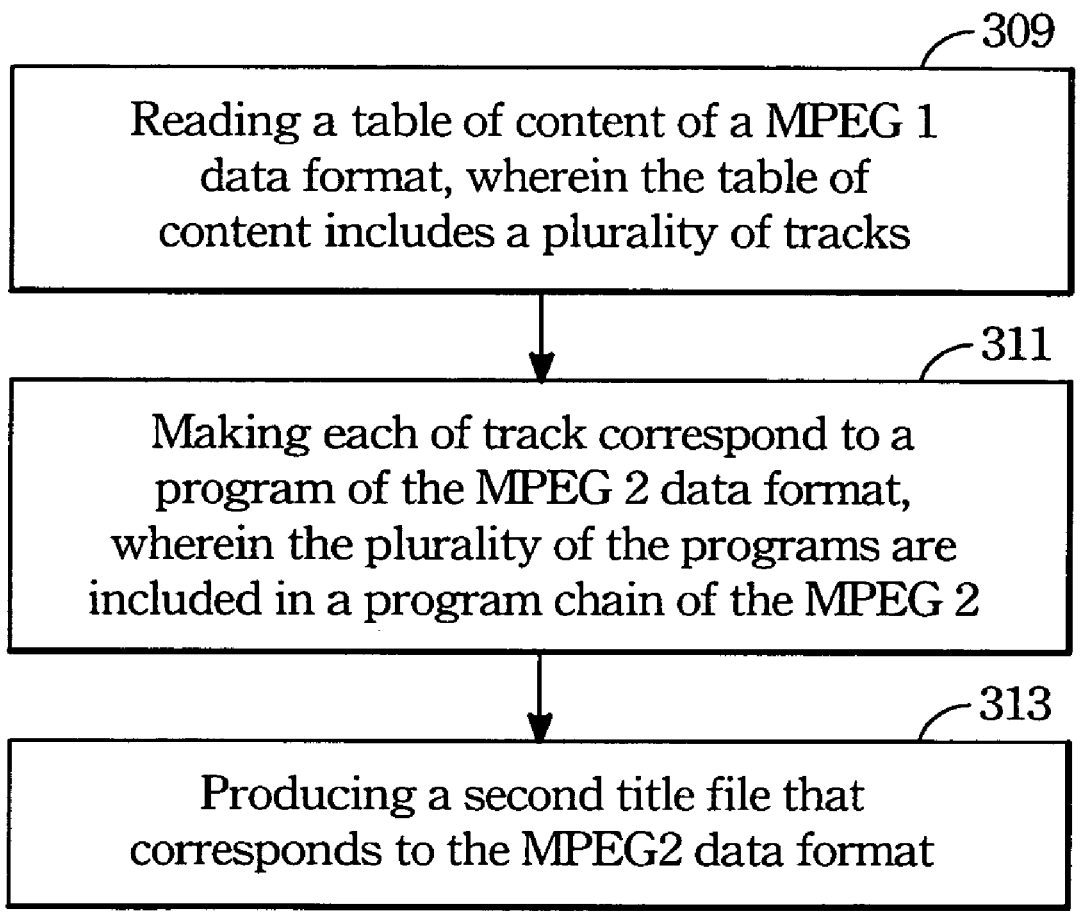
FIG. 3B is a flowchart of the method for converting data format of the present invention.

Therefore, please refer to the FIG. 3A, which shows the flowchart of the method for converting data format of the present invention. The method for converting data format includes the following steps of: reading a play sequence descriptor file of the MPEG 1 data format, wherein the play sequence descriptor file includes a plurality of lists, and each list includes a plurality of items (301); making each list correspond to a program chain of the MPEG 2 data format (303); making each item of each list correspond to a program of each program chain of the MPEG 2 data format (305); and producing a first title file that corresponds to the MPEG 2 data format (307).

Figure 2B:
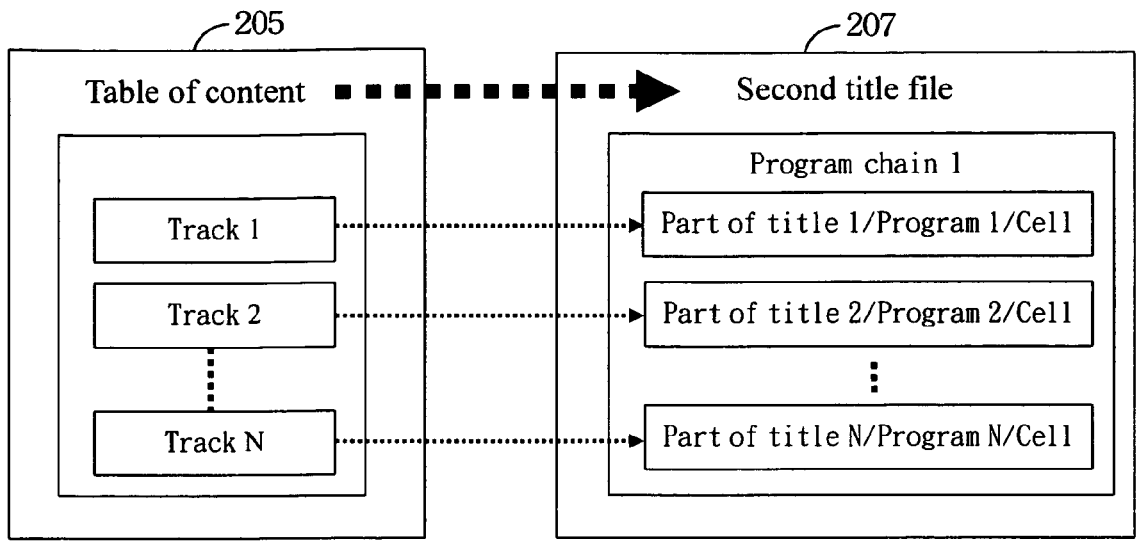
FIG. 2B is a drawing which shows the method for converting data format of the present invention.

The method for converting data format of the present invention further includes the following steps. Please refer to the FIG. 2B that shows the method for converting data format of the present invention. The method includes the steps of: reading a table of content 205, wherein the table of content 205 includes a plurality of tracks; making each track correspond to a program of the MPEG 2 data format, the plurality of programs are included in a program chain of the MPEG 2 data format, wherein the program chain includes a plurality of part of titles, each part of title at least includes a program, each program at least includes a cell, and the program chain constitutes a second title file 207. When the second title file 207 is selected to play, then the playback control function is not supported, but playing according to the track sequence of the table of content 205 is supported. Disc player that can convert the Video 1.1 specification uses such a method, wherein the corresponding method can be achieved by building a table or by look-up table, so that the data format of the VCD can whole correspond to the data format of the DVD. At the same time, correspondence of the Video 1.1 specification and Video 2.0 specification of the VCD both can be supported. Therefore, Please refer to the FIG. 3B which is the flowchart of the method for converting data file of the present invention, and the method for converting data file of the present invention includes the following steps of: reading a table of content of a MPEG 1 data format, wherein the table of content includes a plurality of tracks (309); making each of track correspond to a program of the MPEG 2 data format, wherein the plurality of the programs are included in a program chain of the MPEG 2 (311); and producing a second title file that corresponds to the MPEG 2 data format (313).

Then, please refer to the FIGS. 4A and 4B, both of which show detailed structures of the play list and selection list that have been defined in the VCD specification book, and thus, the detailed descriptions are disregarded here. Because the data format of the VCD can correspond to the data format of the DVD through the above-mentioned method for converting data format of the present invention, some parts of the structures in the play list and the selection list can whole correspond to structure of the DVD. Please refer to the FIG. 5A and FIG. 5B, which show that the play list and the selection list of the VCD correspond to the DVD structure, wherein in the FIG. 5A, the number of items in the play list of the VCD can correspond to the total program numbers (total PG numbers) of the DVD, the list identification (List ID) can correspond to the program chain number (PGC Number) of the DVD, the previous list offset can correspond to the previous program chain number (previous PGC number) of the DVD, the next list offset can correspond to the next program chain number (next PGC number) of the DVD, the return list offset can correspond to the go up program chain number (go up PGC number) of the DVD, the playing time can correspond to the program chain playback time (PGC playback time) of the DVD, the play item wait time can correspond to the cell still time of the DVD, and the play item #1 number can correspond to the cell #1 cell start/end address of the DVD, and the play item #(NOI) number can correspond to the cell #(NOI) cell start/end address of the DVD. In the FIG. 5B, the selection list structure of the VCD structure still has number of selections (NOS) that correspond to the button numbers of the DVD, the time-out list offset can correspond to the force selection button with button command of the DVD, the wait time for time-out can correspond to the button force selection end time, the loop count can correspond to the program repeat count (PG repeat count) of the DVD, the play item number can correspond to the cell start/end address of the DVD, the selection #(BSN) offset can correspond to the button 1 command: jump PGC number of the DVD, and the selection #(BSN+NOS−1) offset can correspond to the button NOS command: jump PGC number of the DVD. The list identification, the previous list offset, and the next list are the same as shown in the FIG. 5A, the detailed descriptions of which are disregarded here.

In the FIG. 5A and FIG. 5B, the NOTE 1 can be disregarded because such a structure is not required when the DVD data is played. The NOTE 2 cannot correspond to the structure of the DVD, and thus must be further researched and developed. In addition to that, the rest of the structure can correspond to the structure of the DVD. The auto pause wait time in the play list structure of the VCD, the default list offset and jump timing in the selection list structure of the VCD cannot correspond to the structure of the DVD. That is to say, there is no corresponding playing function in the structure of the DVD. Therefore, these structures must be further researched and developed through other program language. According to the aforesaid three play functions of the VCD, three corresponding program module are produced through other program language, so as to allow the disc player having single play navigation to play.

To sum up, the data format of the VCD and the data format of the DVD are very similar, and the structure of the VCD and the structure of the DVD are very similar. Therefore, the present invention is to make the data format of the VCD correspond to the data format of the DVD, to make some parts of the structure of the VCD correspond to some parts of the structure of the DVD. Corresponding program modules are produced through program languages for the parts of the structure of the VCD which cannot correspond to the parts of structure of the DVD. Therefore, the disc player having single play navigation can play the converted single data format. That is, the disc player can play DVD disc and VCD disc through one single play navigation.

Although the embodiment of the present invention converts the compact disc having the MPEG 1 data format into the MPEG 2 data format, and then plays. The MPEG 1 data format can be stored in any storing medias, such as hard discs, memories and so on. Through using the method for converting data of the present invention, the MPEG 1 data format can be converted into the MPEG 2 data format.

While the present invention has been particularly shown and described with reference to a preferred embodiment, it will be understood by those skilled in the art that various changes in form and detail may be without departing from the spirit and scope of the present invention.

We claim:

1. A method for converting data format, comprising the steps of:
    reading, by a player device, a table of content of a MPEG 1 data format, wherein said table of content includes a plurality of tracks;
    making, by said player device, each track in said table of content correspond to a program of a MPEG 2 data format, wherein said programs are included in a program chain of said MPEG 2 data format; and
    producing, by said player device, a first title file that corresponds to said MPEG 2 data format;
wherein said program chain includes a plurality of part of titles, each part of title includes at least a program, said programs includes at least a cell, and said program chain constitutes of said first title file.

2. The method according to claim 1, further comprising the steps of:
    reading a play sequence descriptor file of said MPEG 1 data format, wherein said play sequence descriptor file includes a plurality of lists, and each list includes a plurality of items;
    making each list in said play sequence descriptor file correspond to a program chain of said MPEG 2 data format to generate a set of program chains;
    making each item in said each list correspond to a program of each program chain of the MPEG 2 data format in said set of program chains; and
    producing a second title file that corresponds to said MPEG 2 data format;
wherein each program chain includes a plurality of part of titles, each part of title includes at least a program, each program includes at least a cell, and said program chains constitute said second title file.

3. The method according to claim 2, wherein only a list of said play sequence descriptor file corresponds to said program chain of said MPEG 2 data format at one time.

4. The method according to claim 2, wherein all lists of said play sequence descriptor file correspond to all program chains of said MPEG 2 data format at one time.

5. The method according to claim 2, further comprising the steps of:
    making a number of items of said MPEG 1 data format correspond to total program numbers of said MPEG 2 data format;
    making a list identification of said MPEG 1 data format correspond to a program chain number of said MPEG 2 data format;
    making a previous list offset of said MPEG 1 data format correspond to a previous program chain number of said MPEG 2 data format;
    making a next list offset of said MPEG 1 data format correspond to a next program chain number of said MPEG 2 data format;
    making a return list offset of said MPEG 1 data format correspond to a go up program chain number of said MPEG 2 data format;
    making a playing time of said MPEG 1 data format correspond to a program chain playback time of said MPEG 2 data format;
    making a play item wait time of said MPEG 1 data format correspond to a cell still time of said MPEG 2 data format;

making a play item #1 number of said MPEG 1 data format correspond to a cell #1 start/end address of said MPEG 2 data format;

making a play item #(NOI) number of said MPEG 1 data format correspond to a cell #(NOI) start/end address of said MPEG 2 data format;

making a number of selections of said MPEG 1 data format correspond to button numbers of said MPEG 2 data format;

making a time-out list offset of said MPEG 1 data format correspond to a force selection button with button command of said MPEG 2 data format;

making a wait time for time-out of said MPEG 1 data format correspond to a button force selection end time of said MPEG 2 data format;

making a loop count of said MPEG 1 data format correspond to a program repeat count of said MPEG 2 data format;

making a play item number of said MPEG 1 data format correspond to a cell start/end address of said MPEG 2 data format;

making a selection #BSN offset of said MPEG 1 data format correspond to a button 1 command; jump program chain number of said MPEG 2; and making a selection #(BSN+NOS−1) offset of said MPEG 1 data format correspond to a button NOS command: jump program chain number of said MPEG 2 data format.

6. The method according to claim 2, wherein an auto pause wait time, a default list offset, and a jump timing of said MPEG 1 data format are unable to directly correspond to said MPEG 2 data format.

7. The method according to claim 2, wherein said method is applied to a disc player.

8. A method for converting data format, comprising the steps of:

reading, by a player device, a play sequence descriptor file of a MPEG 1 data format, wherein said play sequence descriptor file includes a plurality of lists, and each list includes a plurality of items;

making, by said player device, each list in said play sequence descriptor file correspond to a program chain of said MPEG 2 data format;

making, by said player device, each item in said each list of each list correspond to a program of each program chain of said MPEG 2 data format; and producing, by said player device, a first title file that corresponds to said MPEG 2 data format;

wherein each program chain includes a plurality of part of title, each part of title includes at least a program, each program includes at least a cell, and the plurality of program chain constitute said first title file.

9. The method according to claim 8, wherein only a list of said play sequence descriptor file corresponds to said program chain of said MPEG 2 data format at one time.

10. The method according to claim 8, wherein all lists of said play sequence descriptor file correspond to all program chains of said MPEG 2 data format at one time.

11. The method according to claim 8, further comprising the steps of:

making a number of items of said MPEG 1 data format correspond to total program numbers of said MPEG 2 data format;

making a list identification of said MPEG 1 data format correspond to a program chain number of said MPEG 2 data format;

making a previous list offset of said MPEG 1 data format correspond to a previous program chain number of said MPEG 2 data format;

making a next list offset of said MPEG 1 data format correspond to a next program chain number of said MPEG 2 data format;

making a return list offset of said MPEG 1 data format correspond to a go up program chain number of said MPEG 2 data format;

making a playing time of said MPEG 1 data format correspond to a program chain playback time of said MPEG 2 data format;

making a play item wait time of said MPEG 1 data format correspond to a cell still time of said MPEG 2 data format;

making a play item #1 number of said MPEG 1 data format correspond to a cell #1 start/end address of said MPEG 2 data format;

making a play item #(NOI) number of said MPEG 1 data format correspond to a cell #(NOI) start/end address of said MPEG 2 data format;

making a number of selections of said MPEG 1 data format correspond to button numbers of said MPEG 2 data format;

making a time-out list offset of said MPEG 1 data format correspond to a force selection button with button command of said MPEG 2 data format;

making a wait time for time-out of said MPEG 1 data format correspond to a button force selection end time of said MPEG 2 data format;

making a loop count of said MPEG 1 data format correspond to a program repeat count of said MPEG 2 data format;

making a play item number of said MPEG 1 data format correspond to a cell start/end address of said MPEG 2;

making a selection #BSN offset of said MPEG 1 data format correspond to a button 1 command: jump program chain number of said MPEG 2; and making a selection #(BSN+NOS−1) offset of said MPEG 1 data format correspond to a button NOS command: jump program chain number of said MPEG 2 data format.

12. The method according to claim 8, wherein an auto pause wait time, a default list offset, and a jump timing of said MPEG 1 data format are unable to directly correspond to said MPEG 2 data format.

13. The method according to claim 8, wherein said method is applied to a disc player.

* * * * *